(12) United States Patent
MacLeod

(10) Patent No.: US 11,161,685 B2
(45) Date of Patent: Nov. 2, 2021

(54) LIGHT FOOTING SHORING OF A FLOATING ROOF INSIDE A TANK DURING TANK INSPECTION AND MAINTENANCE

(71) Applicant: Reg MacLeod, Kensington (CA)

(72) Inventor: Reg MacLeod, Kensington (CA)

( * ) Notice: Subject to any disclaimer, the term of this patent is extended or adjusted under 35 U.S.C. 154(b) by 238 days.

(21) Appl. No.: 16/501,988

(22) Filed: Jul. 17, 2019

(65) Prior Publication Data

US 2020/0024068 A1    Jan. 23, 2020

Related U.S. Application Data

(60) Provisional application No. 62/764,112, filed on Jul. 19, 2018.

(51) Int. Cl.
| | | |
|---|---|---|
| *E04G 1/34* | (2006.01) | |
| *F16M 11/32* | (2006.01) | |
| *B65D 88/40* | (2006.01) | |
| *B66F 9/065* | (2006.01) | |
| *E04G 1/36* | (2006.01) | |

(52) U.S. Cl.
CPC ............. *B65D 88/40* (2013.01); *B66F 9/065* (2013.01); *E04G 1/34* (2013.01); *E04G 1/362* (2013.01); *F16M 11/32* (2013.01)

(58) Field of Classification Search
CPC ........ B65D 88/40; B65D 88/34; B65D 88/36; B66F 9/065; B66F 9/06; E04G 1/34; E04G 1/362; E04G 1/36; F16M 11/32; F16M 11/24; F16M 11/26
USPC ................ 220/220; 248/354.1, 354.3–354.6; 52/651.1
See application file for complete search history.

(56) References Cited

U.S. PATENT DOCUMENTS

| | | | | |
|---|---|---|---|---|
| 967,803 | A | * | 8/1910 | Mercer ..................... E04G 1/34 |
| | | | | 182/152 |
| 1,460,375 | A | * | 7/1923 | Gronros .................. E04G 25/08 |
| | | | | 248/354.4 |
| 1,767,142 | A | | 6/1930 | Kramer |

(Continued)

FOREIGN PATENT DOCUMENTS

| | | |
|---|---|---|
| CA | 2652255 | 11/2007 |
| CN | 106077001 | 11/2016 |

(Continued)

*Primary Examiner* — Jonathan Liu
*Assistant Examiner* — Thomas J. Bridges
(74) *Attorney, Agent, or Firm* — Mario Theriault

(57) ABSTRACT

A shoring structure for insertion inside a tank through a manway of the tank and for installation under the floating roof of the tank. This shoring structure has: a telescoping upright structure made of detachable elements; and these detachable elements being configured for movement through the manway of the tank. Foldable top and bottom panels are mountable to the telescoping upright structure, the top and bottom panels being also respectively configured for movement through the manway of the tank. The foldable bottom panel being configured for integration of a pallet jack thereto, for movement of the shoring structure in a raised position inside the tank when the top and bottom panels being mounted to the upright structure. In another aspect, there is provided a combination of a shoring structure and a pallet jack incorporated in this shoring structure. Also described is a method of inspecting or maintaining a tank.

13 Claims, 5 Drawing Sheets

(56) References Cited

U.S. PATENT DOCUMENTS

| | | | |
|---|---|---|---|
| 2,378,984 A * | 6/1945 | Couture | E04F 21/1822 |
| | | | 269/79 |
| 2,735,574 A | 2/1956 | Williams | |
| 2,744,794 A | 5/1956 | Shear | |
| 2,982,379 A * | 5/1961 | Fisher | E04H 12/185 |
| | | | 52/111 |
| 3,104,775 A | 9/1963 | Champagnat | |
| 3,134,501 A | 5/1964 | Bodley | |
| 3,289,788 A * | 12/1966 | Evans | E04G 1/362 |
| | | | 182/128 |
| 3,302,411 A | 2/1967 | Wilkenloh et al. | |
| 3,587,911 A | 6/1971 | Creith | |
| 3,682,271 A * | 8/1972 | Boyd | E04G 1/34 |
| | | | 182/152 |
| 3,815,775 A | 6/1974 | Strunc et al. | |
| 3,861,555 A | 1/1975 | Nelson | |
| 3,902,239 A | 9/1975 | Hirota | |
| 3,910,452 A | 10/1975 | Szasz | |
| 3,915,332 A | 10/1975 | Pladys | |
| 4,018,356 A | 4/1977 | Szasz et al. | |
| 4,036,466 A | 7/1977 | Van Meter | |
| 4,244,487 A | 1/1981 | Kern | |
| 4,286,726 A | 9/1981 | Madsen | |
| 4,776,547 A * | 10/1988 | Vossoughi | F16C 29/045 |
| | | | 248/183.1 |
| 5,087,294 A | 2/1992 | Rechtzigel | |
| 5,123,559 A | 6/1992 | Qiu et al. | |
| 5,178,494 A * | 1/1993 | Zitz | E21D 23/0017 |
| | | | 248/548 |
| 5,230,436 A | 7/1993 | Vaughn | |
| 5,305,905 A | 4/1994 | Zizinia | |
| 5,353,941 A | 10/1994 | Benvegnu et al. | |
| 5,490,605 A | 2/1996 | Cutts | |
| 5,518,553 A | 5/1996 | Moulder | |
| 5,628,421 A | 5/1997 | Jolly | |
| 5,865,127 A * | 2/1999 | Carter | A47B 3/12 |
| | | | 108/115 |
| 6,026,751 A | 2/2000 | Tsai | |
| 6,079,338 A | 6/2000 | Yeh | |
| 6,290,083 B1 | 9/2001 | Witter et al. | |
| 6,529,134 B2 | 3/2003 | Machen et al. | |
| 6,776,105 B2 * | 8/2004 | Rivera | A47K 1/02 |
| | | | 108/24 |
| 6,922,956 B2 | 8/2005 | Johnson et al. | |
| 7,073,530 B2 | 7/2006 | Pyle et al. | |
| 7,225,942 B2 | 6/2007 | Song | |
| 8,113,479 B1 * | 2/2012 | O'Connell | A62B 3/00 |
| | | | 248/351 |
| 8,863,974 B2 | 10/2014 | Ben Afeef | |
| 9,370,806 B2 | 6/2016 | Hancock | |
| 9,599,282 B2 | 3/2017 | Watkin et al. | |
| 9,766,175 B1 | 9/2017 | Maresca, Jr. et al. | |
| 2013/0129457 A1 * | 5/2013 | Massenburg | B66F 9/07577 |
| | | | 414/495 |
| 2016/0137405 A1 * | 5/2016 | Bush | B65D 88/40 |
| | | | 248/354.5 |

FOREIGN PATENT DOCUMENTS

| | | |
|---|---|---|
| EP | 0495243 | 12/1991 |
| UA | 68367 | 8/2004 |

* cited by examiner

LIGHT FOOTING SHORING OF A FLOATING ROOF INSIDE A TANK DURING TANK INSPECTION AND MAINTENANCE

The present application claims the benefit of U.S. Provisional Application No. 62/764,112, filed Jul. 19, 2018.

FIELD OF THE PRESENT INVENTION

The present invention pertains to inspection and maintenance of large tanks and more particularly, it pertains to safety of workers working under floating roofs of large reservoirs.

BACKGROUND

Large tanks for storing hydrocarbon fuel for example, need to be inspected at 10 years intervals, generally. These large hydrocarbon tanks often have a floating roof therein. Tank inspections are carried out to detect any cracks in the inside coating or lining of the tank and to measure associated corrosion of the metal of the tank. When corrosion is detected, sandblasting is done to clean the metal and a new impervious coating is applied to the treated area. If corrosion is more advanced, a section of the tank may be cut out and replaced altogether. As can be appreciated, the inspection of a tank is not a quick and easy job. The workers doing this work must be protected by sturdy and long-lasting shoring installations.

Generally, a floating roof has legs thereunder to support the roof above the floor of the tank when the level of the tank is brought to a minimum. However, in most cases the legs of these roofs are not certified to protect workers moving under the roof.

Examples of floating roofs with legs mounted thereunder can be seen in the following documents:

U.S. Pat. No. 1,767,142 issued to A. A. Kramer on Jun. 24, 1930;
U.S. Pat. No. 2,735,574 issued to W. H. Williams on Feb. 21, 1956;
U.S. Pat. No. 3,104,775 issued to A. Champagnat on Sep. 24, 1963;
U.S. Pat. No. 3,134,501 issued to R. W. Bodley on May 26, 1964;
U.S. Pat. No. 3,587,911 issued to L. C. Creith on Jun. 28, 1971;
U.S. Pat. No. 3,815,775 issued to R. W. Strunc et al., on Jun. 11, 1974;
U.S. Pat. No. 3,861,555 issued to A. H. Nelson on Jan. 21, 1975;
U.S. Pat. No. 3,902,239 issued to T. Hirota on Sep. 2, 1975;
U.S. Pat. No. 3,910,452 issued to I. E. Szasz on Oct. 7, 1975;
U.S. Pat. No. 3,915,332 issued to N. L. Pladys on Oct. 28, 1975;
U.S. Pat. No. 4,018,356 issued to I. E. Szasz et al., on Apr. 19, 1977;
U.S. Pat. No. 4,244,487 issued to R. C. Kern on Jan. 13, 1981;
U.S. Pat. No. 4,286,726 issued to G. J. Madsen on Sep. 1, 1981;
U.S. Pat. No. 5,087,294 issued to A. Rechtzigel on Feb. 11, 1992;
U.S. Pat. No. 5,123,559 issued to Z. F. Qiu et al., on Jun. 23, 1992;
U.S. Pat. No. 5,230,436 issued to L. G. Vaughn on Jul. 27, 1993;
U.S. Pat. No. 5,305,905 issued to A. A. Zizinia on Apr. 26, 1994;
U.S. Pat. No. 5,353,941 issued to J. A. Benvegnu et al., on Oct. 11, 1994;
U.S. Pat. No. 5,490,605 issued to W. T. Cutts on Feb. 13, 1996;
U.S. Pat. No. 5,628,421 issued to R. P. Jolly on May 13, 1997;
U.S. Pat. No. 6,290,083 issued to A. Witter et al., on Sep. 18, 2001;
U.S. Pat. No. 6,529,134 issued to J. L. Machen et al. On Mar. 4, 2003;
U.S. Pat. No. 6,922,956 issued to B. M. Johnson et al., on Aug. 2, 2005;
U.S. Pat. No. 7,073,530 issued to M. A. Pyke et al., on Jul. 11, 2006;
U.S. Pat. No. 7,225,942 issued to Z. Song on Jun. 5, 2007;
U.S. Pat. No. 8,863,974 issued to M. A. Ben-Afeef on Oct. 21, 2014;
U.S. Pat. No. 9,370,806 issued to J. C. Hancock on Jun. 21, 2016;

In the past, the inspection of a tank required the fabrication of cribs or frameworks evenly spaced apart inside the tank to protect workers in case of a collapse of the floating roof. These preventative frameworks were made of wooden blocks that were small enough to pass through the manway of the tank. After an inspection of a tank is completed, these wooden blocks are discarded because of the hydrocarbon that has seeped inside the wood of the blocks, making the wood unusable for general purpose. These frameworks represent a big investment in the manpower required to cut the blocks, to pass the blocks through the manway of the tank, to build the cribs and to dismantle the cribs. It also represents a big loss in the waste of the blocks upon completion of the work.

Prior art literature also contains other type of overhead structures to protect workers working under a roof of some type, such as a flying deck-type concrete form, as described in:

U.S. Pat. No. 4,036,466 issued to R. A. Van Meter on Jul. 19, 1977.

In other examples, mine roof support devices are described in:

U.S. Pat. No. 3,302,411 issued to W. Wilkenloh et al. on Feb. 7, 1967;
U.S. Pat. No. 5,178,494 issued to A. Zitz et al., on Jan. 12, 1993.

However, the overhead protection structures described in these documents would be difficult to insert through the manway of a tank, and difficult to move inside the tank.

As such there is a need for a preventative shoring structure that can be introduced inside a tank, assembled, used, dismantled, washed clean and stored for reuse.

SUMMARY

There is provided herein a description of a shoring structure for use inside a tank to preventively support the floating roof of the tank and to protect workers working inside the tank.

In one aspect of the present invention, there is provided; a shoring structure for insertion inside a tank through a manway of the tank and for installation under the floating roof of the tank. This shoring structure has:
  a telescoping upright structure made of detachable elements; and these detachable elements being configured for movement through the manway of the tank;

foldable top and bottom panels mountable to the telescoping upright structure, the top and bottom panels being respectively configured for movement through the manway of the tank; and the foldable bottom panel being configured for incorporation of a pallet jack thereto, for movement of the shoring structure in a raised position inside the tank when the top and bottom panels are mounted to the upright structure.

In another aspect of the present invention, there is provided a combination of a shoring structure for introduction inside a tank through a manway of the tank and for installation under the floating roof of the tank, and a pallet jack incorporated in the shoring structure for movement of the shoring structure in a raised position inside the tank, comprising;

the aforesaid telescoping upright structure; the foldable top and bottom panels, wherein the pallet jack is incorporated into the bottom panel.

In yet another aspect of the present invention, there is provided a method for inspecting a tank comprising the following steps:

moving a folded, rubber-lined bottom panel through a manway of the tank;

moving a folded, rubber-lined top panel through the manway of the tank;

moving a telescoping disassembled upright structure through the manway of the tank;

moving a pallet jack through the manway of the tank;

unfolding the top and bottom panels and assembling the telescoping structure to the top and bottom panels, between the top and bottom panels, forming a shoring structure inside the tank;

incorporating the pallet jack to the bottom panel, and using the pallet jack, lifting and moving the shoring structure inside the tank.

Because of the folding of the top and bottom panels, these panels can be deployed inside a tank, to cover a large surface area, thereby offering a low surface pressure. Consequently, the shoring structure can be used inside a tank without adverse effect to the impervious lining or coating over the bottom of the tank. Because of the modular and foldable aspects of the shoring structure, the preferred shoring structure can be used and reused numerous times.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

A preferred embodiment of the shoring structure and method according to the present invention is described herein with the aid of the accompanying drawings, in which like numerals denote like parts throughout the several views.

The drawings presented herein are presented for convenience to explain the functions of all the elements included in the preferred embodiment of the present invention. Elements and details that are obvious to the person skilled in the art may not have been illustrated. Conceptual sketches have been used to illustrate elements that would be readily understood in the light of the present disclosure. These drawings are not fabrication drawings, and should not be scaled.

Many components of the preferred shoring structure were not illustrated to facilitate the understanding of the basic concept of the design. The components that were not illustrated are those for which the nature, mountings and functions would be obvious to the person skilled in the art of millwright work and tank maintenance.

DETAILED DESCRIPTION OF THE PREFERRED EMBODIMENT

Figure 1:
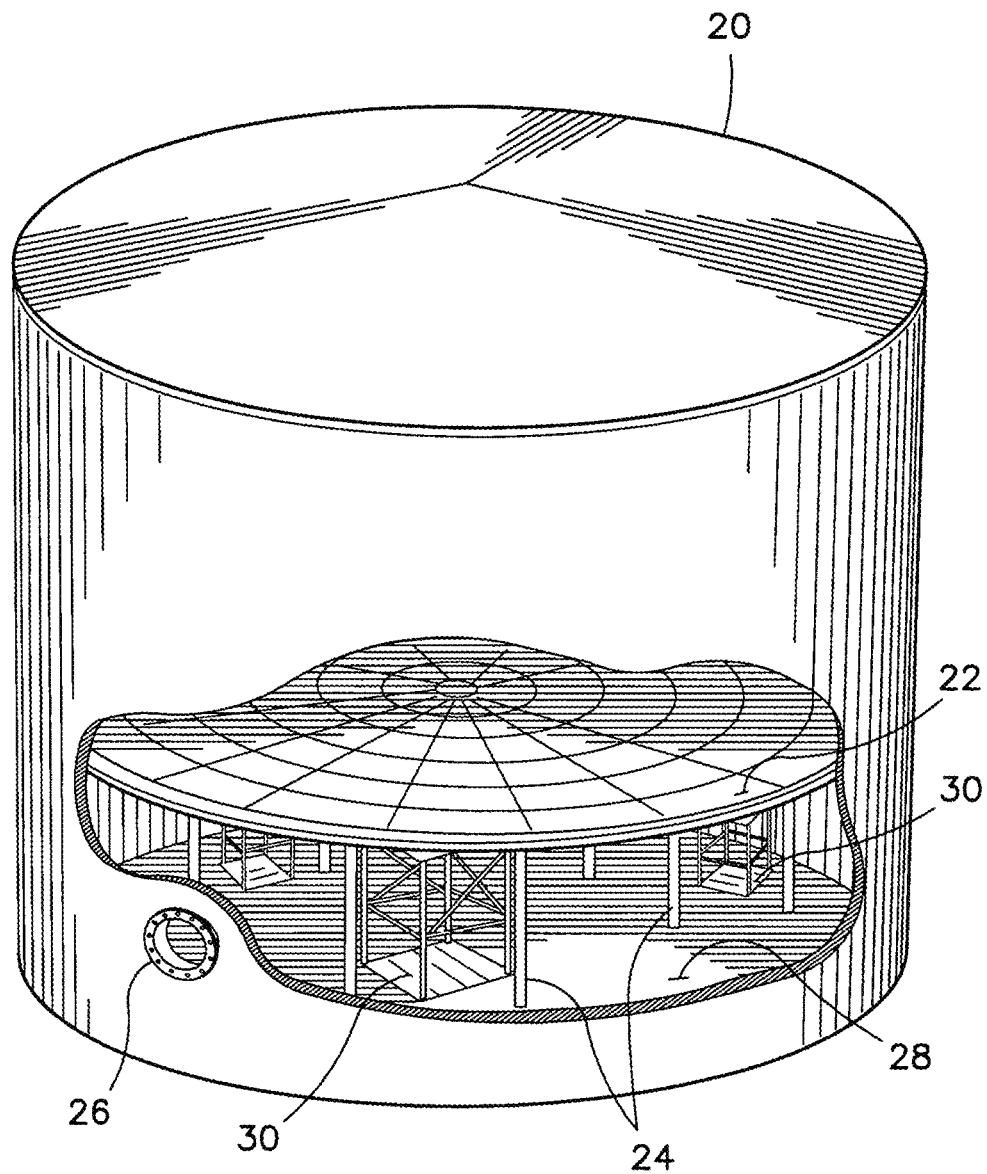
FIG. 1 illustrates a not-to-scale perspective view of a tank with a floating roof, as is referred to in the present specification.

Referring now to FIG. 1, the tank or reservoir 20 of interest herein is made of steel generally and has a floating cover 22 mounted therein. When the tank is near empty, the floating cover 22 is supported to the bottom of the tank by legs 24. However, these legs 24 may have had some deterioration by corrosion for example, and are not completely safe to protect workers working under the floating cover 22.

The tank 20 of interest herein generally have a manway 26 on its side through which workers can enter the tank 20 to inspect or repair the tank 20 or the cover 22. Such manway usually have a diameter of twenty-four inches, or smaller.

The bottom surface of the tank 20 has a sealing membrane 28 laid thereon, and this membrane is not made to support concentrated loads. Therefore, any foot traffic or other movement inside the tank must be done carefully.

For illustrative purposes, three preferred shoring structures 30 according to the present invention, are shown in FIG. 1, in a cover-supporting position during inspection or repair work inside the tank 20. It will be appreciated that the shoring structures 30 in this illustration are only partially illustrated.

Figure 2:
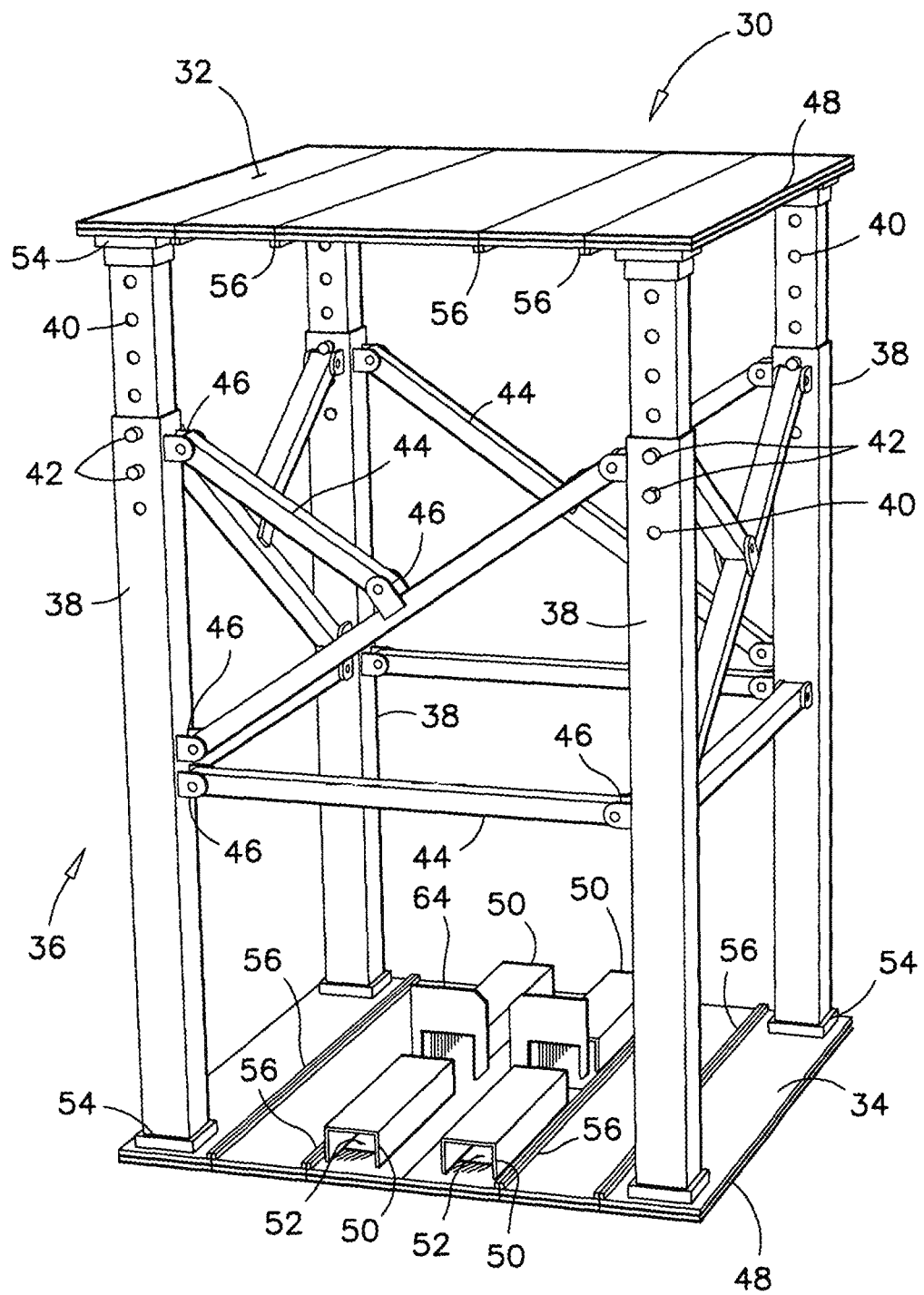
FIG. 2 illustrates a not-to-scale perspective view of a shoring structure according to the preferred embodiment of the present invention.

The preferred shoring structure 30 according to the preferred embodiment is better illustrated in FIG. 2. The preferred shoring structure 30 comprises a flat top and bottom panels 32, 34. An upright structure 36 is mounted between the top and bottom panels 32, 34. This upright structure 36 comprises four telescoping posts 38. For more safety, the alignment of two holes 40 are used to receive two pins 42 in each post 38 for locking the two parts of each post 38 at a desired height setting. Cross-bracing 44 are mounted between the posts 38. Each piece of cross-bracing 44 is fastened to a post 38 or to another brace by clevis and pin connectors 46.

Each of the top and bottom panels 32, 34 has a layer of rubber 48 bounded thereto. This layer of rubber 48 is bounded to the top surface of the top panel 32, and to the bottom surface of the bottom panel 34. These rubber layers 48 provide a soft contact between the shoring structure 20 and the bottom 28 of the tank and between the shoring structure 30 and the underside of the floating roof 22.

The bottom panel 34 has pockets 50 thereon to register with the arms of a small pallet jack (not shown). Each one of these pockets 50 preferably has a window 52 through the bottom panel 34 to allow the wheels of a pallet jack (not shown) to extend down to the tank floor.

The posts 38 of the upright structure 36 are connected to the top and bottom panels 32, 34 by way of respective connectors 54, that quickly and easily mate with the ends of the telescoping posts 38 of the upright structure 36.

Figure 3:
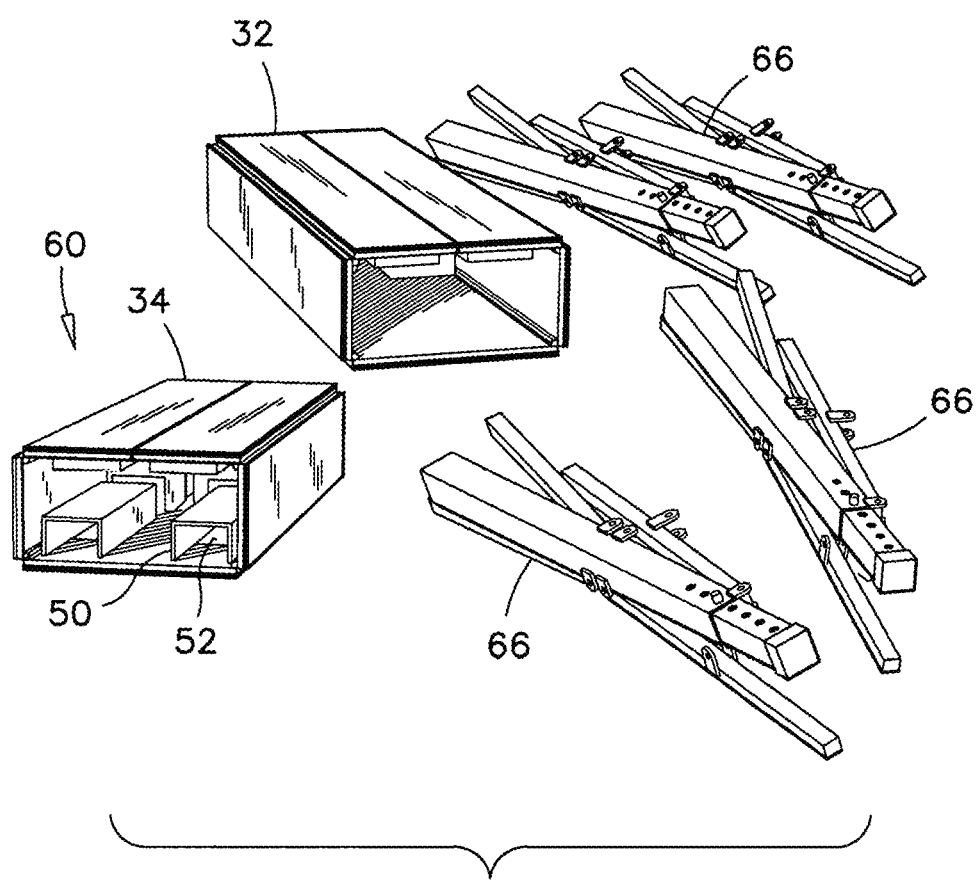
FIG. 3 is an exploded view of the preferred shoring structure illustrated in FIG. 2.
Figure 4:
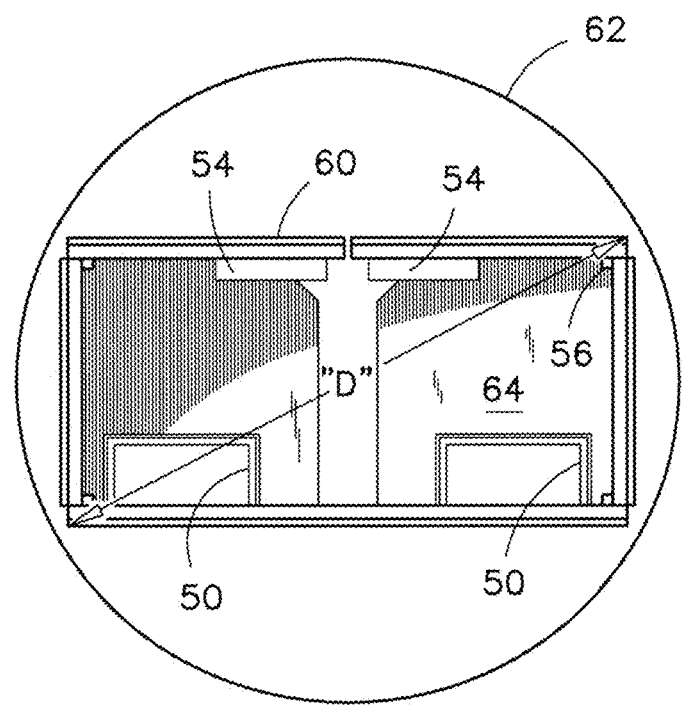
FIG. 4 shows the outline of a manway of a tank with a four-segment version of a bottom portion of the shoring structure passing through this manway.

The top and bottom panels 32, 34 are made of four sections and are foldable to a rectangular arrangement by way of a series of hinges 56, such as piano hinges or the like for example. Each of the top and bottom panels 32, 34 are foldable into a rectangular formation 60 as shown in FIG. 3. Referring to FIG. 4, the dimensions of each of the four sections of each panel 32, 34 are selected such that the rectangular formation 60 has a cross-section diagonal "D" that is smaller than the diameter of the opening 62 of a standard twenty-four inch manway.

Figure 6:
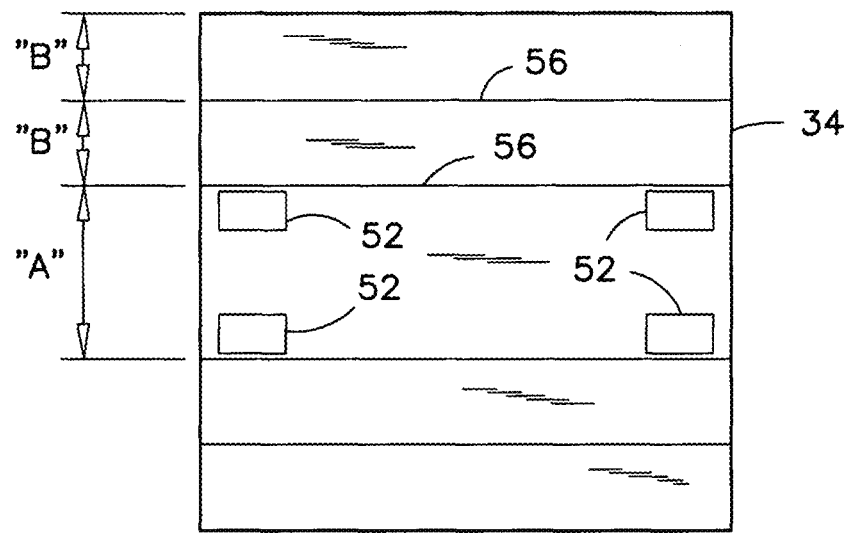
FIG. 6 shows a bottom view of the bottom panel of the shoring structure.

For example, referring to FIG. 6, the panels 32, 34 illustrated herein to fit into a twenty-four inch manway 26 have overall side dimensions of 40 inches by 40 inches, wherein the width "A" of the central portion is 20 inches, and the width "B" of the wing portions is 10 inches respectively. Although a square panel is illustrated in the drawings, it will be appreciated that each of the top and bottom panels 32, 34 can have a rectangular surface of 40 inches by 60 inches or more for example. The diameter of the manway 26 limits only one side dimension of each panel.

Both the top and bottom panels 32, 34 are foldable in a same way, as illustrated in FIGS. 2, 3 and 4. The top panel 32 has its hinges 56 on the underside thereof such that the top panel 32 has a rigid side facing upward and a flexible side facing downward. The bottom panel 34 has its hinges 56 on its upperside such that the bottom panel 34 has a rigid side facing downward and a flexible side facing upward. Each of the top and bottom panels 32, 34 has a pair of pattern plates 64 attached thereto to guide the folding thereof and to retain the rectangular aspect of the panels 32, 34 in a folded mode. Each of these pattern plates 64 has a hole there through to allow for the passage of the arms of a pallet jack, as will be explained when referring to FIG. 6.

In use, both the top and bottom panels 32, 34 are folded and passed through the manway of the tank. Each element of the upright structure 36 is passed through the manway of the tank, separately or in pre-assembled units 66 as illustrated in FIG. 3, for reassembly inside the tank, between the top and bottom panels 32, 34. Using a pallet jack, and incorporating this pallet jack into the bottom panel 34, each shoring structure 30 is positioned inside the tank 20 in such as way as to protect workers in case of a collapse of the floating roof 22. For example, it would be recommended to use thirty-two (32) equally-spaced shoring structures 30 inside a 150 foot tank.

Because the bottom panel 34 is as wide as the manway can accept, the surface pressure applied to the floor 28 of the tank is minimal. Because the bottom panel 34 is lined with a layer 48 of rubber, the risk of scratching the liner or coating on the bottom 28 of the tank is also minimal. Because of these features, protection of workers inside of a tank is done without adverse effect to the impermeability of the tank.

Figure 5:
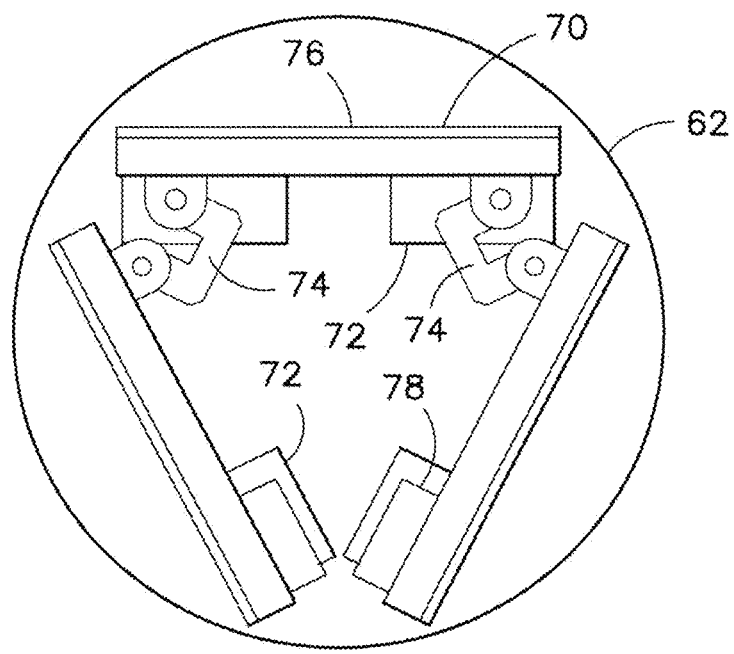
FIG. 5 shows the outline of a manway of a tank with an alternate three-segment version of a bottom portion of the shoring structure passing through this manway.

Referring back to FIG. 5, there is illustrated therein a folded plate 70 arranged in a triangular formation. This illustration has been provided to demonstrate that the top and bottom panels 32, 34 of the preferred shoring structure 30 are not limited to a folding in a rectangular formation. Both panels can be made to fold in a triangular mode, as shown. This triangular folded arrangement 70 has pallet jack pockets 72, hinges 74 on the flexible side thereof, a rubber layer 76, and seats 78 to receive the end of the telescoping posts 38.

Also, one may consider a folded panel with more than three or four sides, and a geometry other than a triangle or a rectangle. Therefore, the top and bottom panels of the preferred shoring structure in a folded mode is not limited to the geometry illustrated.

Figure 7:
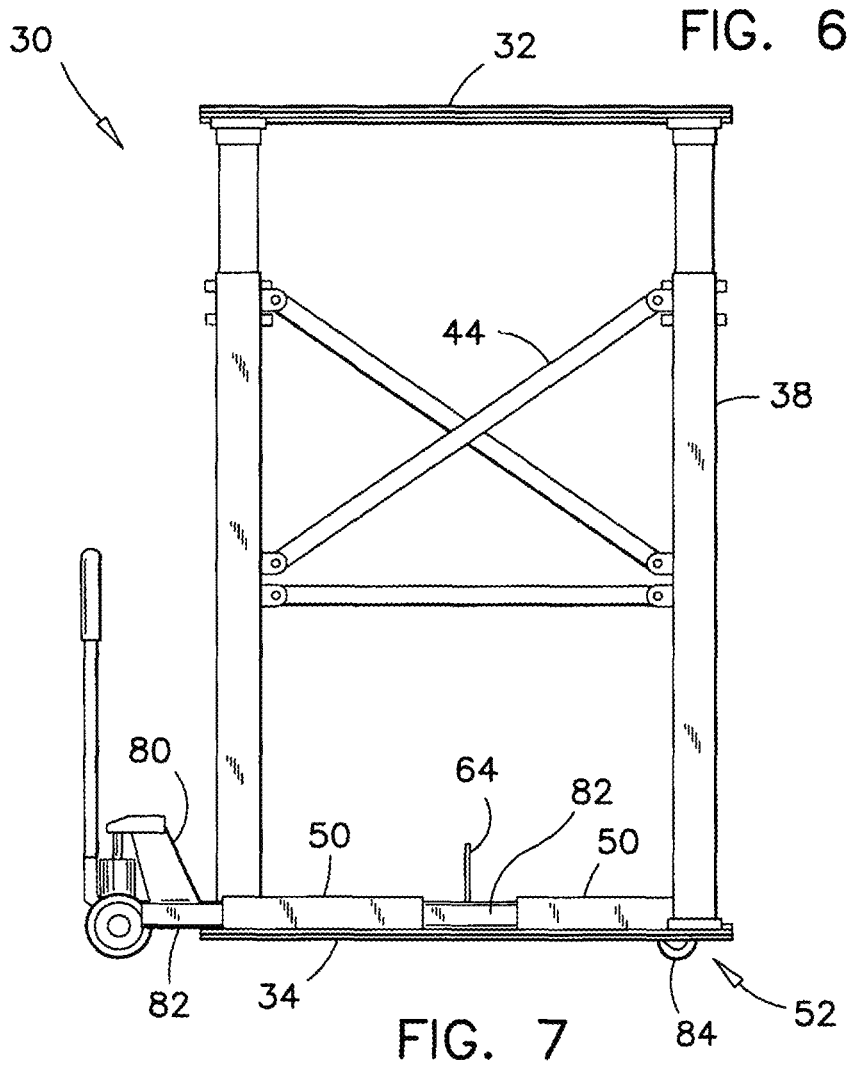
FIG. 7 illustrates a preferred way of moving the preferred shoring structure inside a tank, using a pallet jack incorporated in the bottom panel of the shoring structure.

After assembling a shoring structure 30 inside a tank 20, a pallet jack 80 is preferably incorporated into the bottom panel 34, as can be appreciated from FIGS. 6-7. The arms 82 of the pallet jack are slid into the pockets 50 with the forward wheels 84 of the pallet jack 80 aligning with a pair of windows 52 in the bottom panel 34.

The pallet jack 80 is operated to lift the shoring structure 30 off the floor 28 of the tank and to move it inside the tank. The pallet jack 80 is possibly modified for this purpose so that its arms 82 are spaced apart to fit into the pockets 50 on the bottom plate 34 of the shoring structure 30, with the front wheels 82 protruding through the windows 52 in the bottom panel 34.

Pockets 50 and windows 52 are provided on both sides of the bottom panel 34 so that the pallet jack 80 can be positioned on one side of the shoring structure 30 or the other.

With the front wheels 84 of the pallet jack 80 positioned to extend down through the windows 52 through the bottom panel 34, the entire shoring structure 30 can be lifted off the floor 28, and moved around inside a tank, without any danger of scratching the floor 28 of the tank.

What is claimed is:

1. A shoring structure for insertion inside a tank through a manway of said tank and for installation under the floating roof of said tank, comprising;
    a telescoping upright structure made of detachable elements; said detachable elements being configured for movement through said manway;
    foldable top and bottom panels mountable to said telescoping upright structure, said top and bottom panels being respectively configured for movement through said manway;
    said foldable bottom panel being configured for incorporation of a pallet jack thereto, wherein said bottom panel has pockets thereon for enclosing arms of a pallet jack, and windows there through aligning with forward wheels of said pallet jack when said arms of said pallet jack are inserted in said pockets.

2. The shoring structure as claimed in claim 1 wherein said detachable elements comprising telescoping posts wherein a height of each said post is adjustable by aligning holes and pins through said holes, and each of said posts has a pair of aligning holes respectively filled by a pair of pins.

3. The shoring structure as claimed in claim 1, wherein said top and bottom panels each having connectors thereon to receive an end of a respective one of said posts.

4. The shoring structure as claimed in claim 1, wherein said top and bottom panels being configured for folding into a rectangular formation.

5. The shoring structure as claimed in claim 4, wherein said top and bottom panels each has a pattern plate affixed thereto for guiding and for securing said rectangular formation.

6. The shoring structure as claimed in claim 1, wherein said top panel has a first rubber layer bonded to a top surface thereof, and said bottom panel has a second rubber layer bonded to a bottom surface thereof.

7. A combination of a shoring structure for introduction inside a tank through a manway of said tank and for installation under the floating roof of said tank, and a pallet jack incorporated in said shoring structure, comprising;

a telescoping upright structure made of detachable elements; said detachable elements being configured for movement through said manway;

foldable top and bottom panels mountable to said upright structure, said top and bottom panels being respectively configured for movement through said manway;

a pallet jack being configured for movement through said manway;

said pallet jack being incorporated into said bottom panel, for movement of said shoring structure in a raised position inside said tank when said top and bottom panels being mounted to said upright structure.

8. The combination as claimed in claim 7, wherein said detachable elements comprising telescoping posts wherein a height of each said post is adjustable by aligning holes and pins through said holes, and each of said posts has a pair of aligning holes respectively filled by a pair of pins.

9. The shoring structure as claimed in claim 7, wherein said top and bottom panels each having connectors thereon to receive an end of a respective one of said posts.

10. The shoring structure as claimed in claim 7, wherein said top and bottom panels being configured for folding in a rectangular formation.

11. The shoring structure as claimed in claim 10, wherein said top and bottom panels each has a pattern plate affixed thereto for guiding and for securing said rectangular formation.

12. The shoring structure as claimed in claim 7, wherein said bottom panel has pockets for enclosing arms of said pallet jack, and windows there through aligning with forward wheels of said pallet jack when said arms of said pallet jack are inserted in said pockets.

13. The shoring structure as claimed in claim 7, wherein said top panel has a first rubber layer bonded to a top surface thereof, and said bottom panel has a second rubber layer bonded to a bottom surface thereof.

\* \* \* \* \*